Patented Feb. 1, 1938

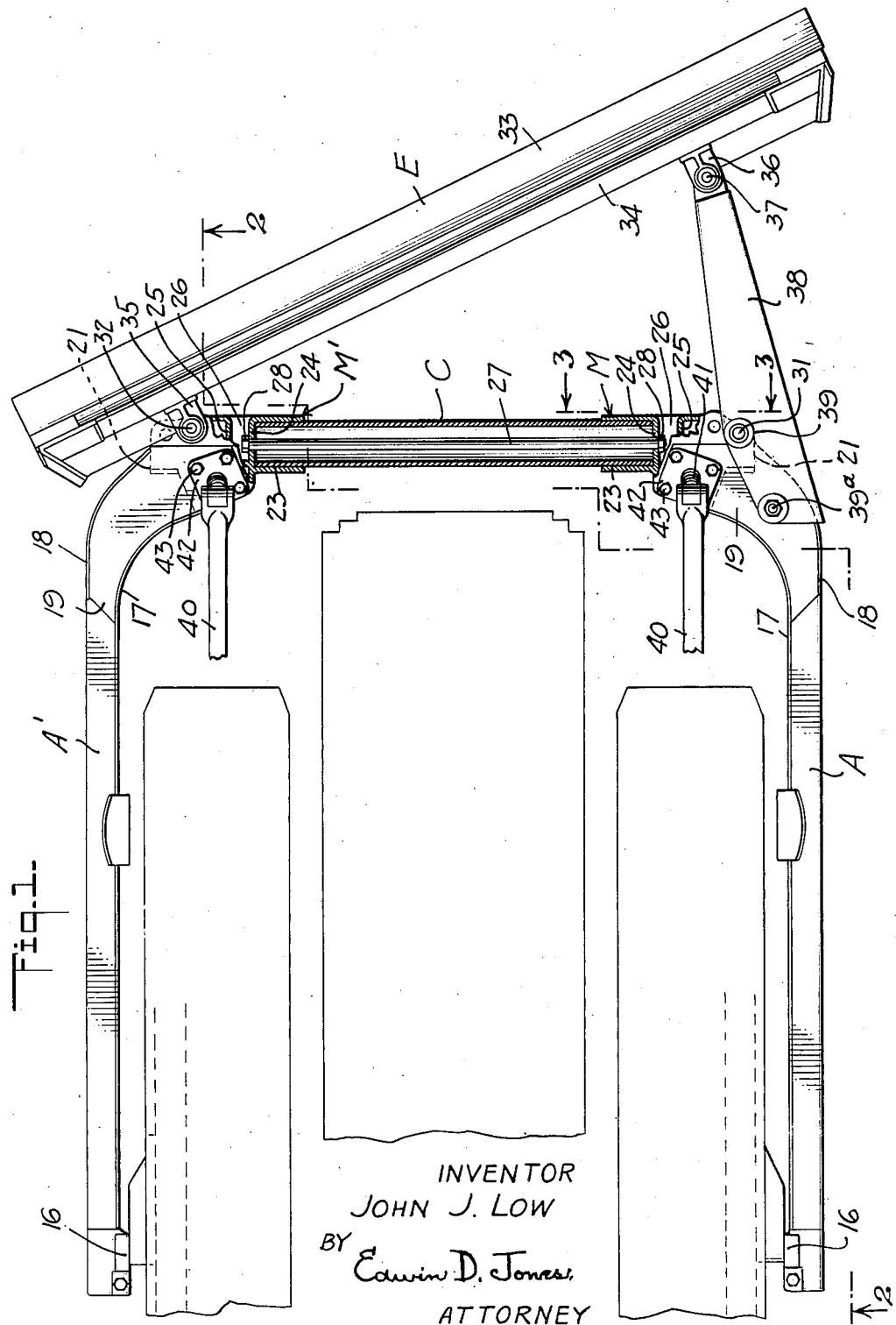

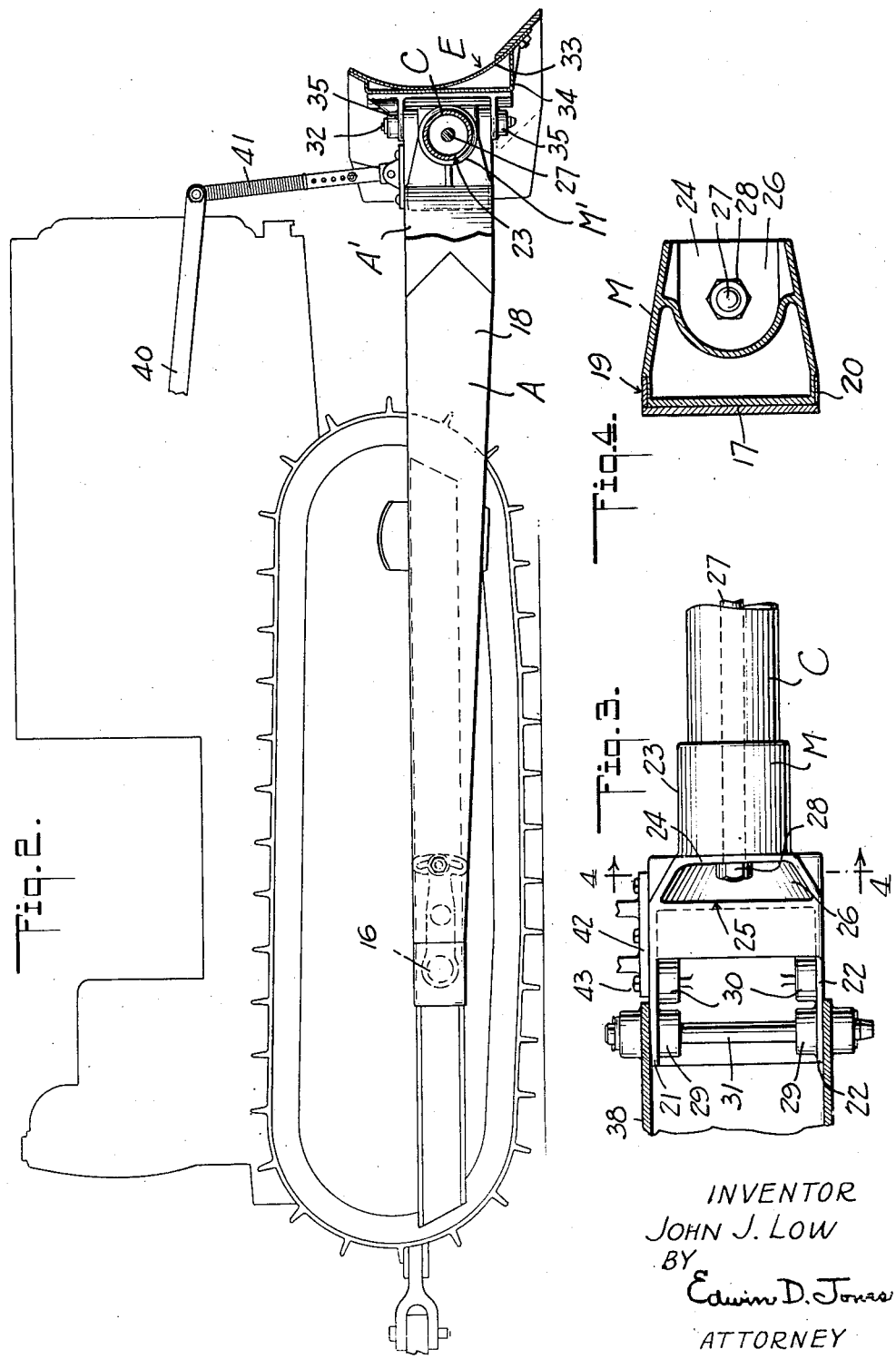

2,107,123

UNITED STATES PATENT OFFICE 2,107,123

IMPLEMENT MOUNTING FOR ROAD WORK-
ING MACHINES

John J. Low, Los Angeles, Calif., assignor to Kay-
Brunner Steel Products Inc., a corporation of
Delaware Application April 20, 1936, Serial No. 75,381

9 Claims. (Cl. 37—144)

My invention relates to road working machines of that type embodying any one of various forms of implements which is adapted by the machine to be advanced over the ground for moving the earth in the building of a road, and wherein the implement in order to perform various forms of work, is capable of adjustment on the machine by a mounting which is operable to effect such adjustment. Such implement mountings as heretofore proposed are rigid and unyielding to the severe and varied stresses to which they are subjected when in use, and, hence, are frequently broken or distorted.

It is a purpose of my invention to provide an implement mounting for road working machines which embodies a structure made up of parts so connected one to the other that the mounting is capable of yielding or flexing to a degree sufficient to absorb without breakage or distortion the stresses to which it is subjected when in use, and yet at all times permitting and effecting adjustment of the implement when and as required.

It is also a purpose of my invention to provide an implement mounting which is made up of a plurality of parts capable of being readily assembled and disassembled to facilitate transporting the mounting from place to place; and the association of its parts to permit substitution of other parts of different dimensions so that the mounting as a whole can be varied in size to permit of its application to road working machines of different widths and lengths, and to accommodate implements of varying lengths.

I will describe only one form of implement mounting for road working machines embodying my invention, and will then point out the novel features thereof in the claims.

In the accompanying drawings:

Fig. 1 is a view showing in top plan and partly in section, one form of implement mounting embodying my invention in applied position on a road working machine.

Fig. 2 is a vertical sectional view taken on the line 2—2 of Fig. 1.

Fig. 3 is an enlarged fragmentary sectional view taken on the line 3—3 of Fig. 1.

Fig. 4 is a vertical sectional view taken on the line 4—4 of Fig. 3.

In carrying out my invention I provide a pair of arms A and A' connected at one end by a cross member C which has a running fit in socket members M and M' carried by the respective arms. The rear ends of the arms are provided with connections 16 by which they are mounted for pivotal movements about a common transverse axis on a conventional form of road working machine shown in phantom in Figs. 1 and 2. The connections 16 are preferably of a charcter shown in my copending application for Roadway excavating machine filed December 18, 1935, Serial No. 55,037. The arms as mounted are disposed at opposite sides of the machine with their forward ends curved inwardly and broadened as shown. Except for the reverse curvature of these forward ends the arms are identical in construction and similarly the socket members M and M' are of like construction but reversely arranged. Hence, a description of one arm and one socket member will suffice for both.

One arm A is of hollow construction with its forward end made up of inner and outer plates 17 and 18 secured at their edges to upper and lower plates 19 and 20. Parallel and flat wings 21 and 22 of the socket member M extend into the arm and are secured by welding to the confronting sides of the upper and lower plates 19 and 20, and as will be noted from the showing in Figs. 1 and 4 the wings are shouldered to form abutments for the edges of the arm plates.

As best shown in Fig. 3, the socket member M is in the form of a single casting of box like construction so made as to lend the requisite strength thereto and having an integral socket 23 of tubular form projecting from the inner side of the casting. This socket is open at its outer end but closed at its inner end by a wall 24, spaced from another wall 25 to form a pocket 26 which is open at the front side of the casting.

The cross member C is in the form of a metal pipe and its uniform diameter is such that its ends have a running fit in the sockets 23, 23 of the two socket members M and M'. As shown in Fig. 1 the ends of the cross member abut the walls 24, 24, and by means of a tie rod 27 they are held in this position within the sockets to provide an operative connection between the side arms A and A' in the formation of a U-shaped frame. The rod is extended through the cross member with its ends projecting through the walls 24, 24 and into the pockets 26, 26 where they are provided with nuts 28, 28 for confining the rod against displacement. It will be understood that the pockets permit the nuts to be applied to or removed from the rod ends.

Those portions of the wings 21 and 22 which extend forwardly of the plates 19 and 20 are formed with outside pads 29, 29 and inside pads 30, 30, both of which are drilled to form holes therethrough. Through the pads 29, 29 of the socket member M and the pads 30, 30 of the socket member M' pins 31 and 32, respectively, are extended and secured for attaching an earth working implement E to the socket members.

In the present instance I have shown the implement E as comprising a concavo-convex blade 33 fixed to a beam 34 coextensive in length therewith and having two pairs of ears 35 and 36. One pair of ears 35 receive the pin 32 to attach the beam to the socket member M', while the ears 36 receive a pin 37. This pin 37 is extended through openings in the forward end of an arm 38 which is of channel form to receive at its rear end the forward end of the arm A and a part of the socket member M.

To secure the arm 38 to the arm A the pin 31 is utilized and extended through drilled pads 39 on the arm 38, and also a bolt 39 is extended through the arm and the plates 19 and 20. In this manner the arm is rigidly secured to the arm A to form an extension thereof, and as connected to the implement beam 34, the extension coacts with the socket member M' in supporting the blade 33 at an angle to the cross member C.

In the art of road working machines such an implement is known as a trail builder as distinguished from a similar blade arranged parallel to the cross member C and known as a bulldozer. To attach a bulldozer to the frame, pins can be extended through the outside pads 29 of both arms A and A'.

With the implement and its mounting applied to the road working machine as shown in Figs. 1 and 2, the implement is disposed in advance of the machine for moving earth under advance movement of the machine. To adjust the implement in its performance of various road working operations it is adapted to be elevated and lowered through a suitable hoisting mechanism on the machine which includes arms 40 connected to extensible links 41, with the latter in turn connected to the forward ends of the arms A and A' by plates 42 secured by bolts 43 to the plates 19 and the wings 21. Thus, through operation of the hoisting mechanism the implement supporting frame can be swung about its pivots 16 to cause the implement to occupy the position desired.

It is not only while lifting the implement and its mounting but also during forward movement too that the mounting is subjected to those damaging stresses which my mounting is designed to absorb without distortion or breakage. When lifting the implement with a load of earth thereon varying in weight from end to end of the implement, unequal stresses are set up in the arms of the mounting. Further, unequal stresses will be produced when the machine is tilted to one side or the other as when moving over a surface which is inclined in either direction transversely of the path of travel of the machine. These stresses are intensified when using a trail builder type of implement due to the fact that the extension 38 increases the effective length of the arm A beyond that of the arm A', and the implement is disposed at an oblique angle to its path of forward travel.

By constructing the mounting as described herein, arms A and A' at their forward ends are connected by the socket members and cross member to move about the cross member as an axis. In this manner the arms can, in response to stresses, which as imposed thereon are unequal, move independently of each other to a degree sufficient to cause the frame as a whole to yield or flex sufficiently to absorb these stresses and thereby prevent distortion or breakage of any part of the mounting.

The ready detachability of the cross member C from the socket members M and M' permits easy disassembly of the frame to facilitate transporting the mounting from place to place. By varying the length of the arms A and A' and the length of the cross member C, the frame as a whole can be varied in size to render it applicable to a road working machine of any length and width. Similarly by varying the length of the cross member alone implements of different lengths can be applied to and supported by the frame.

Although I have herein shown and described only one form of implement mounting for road working machines embodying my invention it is to be understood that various changes and modifications may be made herein without departing from the spirit of my invention and the spirit and scope of the pending claims.

I claim:

1. An implement mounting for road working machines, comprising; a pair of arms adapted at one of their ends to be pivotally supported on a road working machine at opposite sides thereof, and at their other ends to support an earth working implement thereon; and means so connecting the arms adjacent their forward ends as to allow movement of the arms relatively about an axis transversely of the arms.

2. An implement mounting for road working machines, comprising; a pair of arms; a rigid cross member; and means for connecting the arms to the cross member so that the arms can swing independently of each other about the cross member as a center.

3. An implement mounting for road working machines, comprising; a pair of spaced arms; sockets transversely on the arms; and a member extending between the arms with its ends secured to and rotatably fitted in said sockets.

4. An implement mounting for road working machines, comprising; a pair of spaced arms; sockets transversely on the arms; a member extending between the arms with its ends rotatably fitted in said sockets; and means extending through said member and engaging said sockets for securing the ends of the member against removal from the sockets.

5. An implement mounting for road working machines, comprising; a pair of spaced arms; sockets on the arms; a member extending between the arms with its ends rotatably fitted in said sockets; and a tie rod extending through said member and secured in said sockets for confining the member in the sockets.

6. An implement mounting for road working machines, comprising; a pair of spaced arms adapted to be pivoted transversely at one of their ends on a road working machine to swing about a fixed axis; and means for connecting the other ends of said arms to each other so that each arm is capable of independent motion about an axis substantially parallel to said fixed axis.

7. An implement mounting for road working machines, comprising; a pair of spaced arms; socket members on the arms having sockets confronting each other and open pockets; a cross member extending between the arms with its ends rotatably fitted in said sockets; a tie rod extending through the cross member and sockets and into said pockets; and nuts on the tie rod ends accessible through said pockets.

8. In combination; a road working machine; a frame having a pair of arms pivoted transversely at one of their ends on said machine, one of said arms being longer than the other so as to extend a greater distance from the pivot thereof; means connecting the other end of the short arm to the long arm short of the corresponding end of the latter so that each arm is capable of motion about its pivot independently of the other; and an implement secured to and bridging said arms at that side of said means opposite from the arm pivots.

9. In an implement mounting for road working machines; a socket member having a sleeve, a wall at one end of the sleeve provided with an opening, and a pocket transversely of said wall through which access may be had to said opening.

JOHN J. LOW.